United States Patent
Condron

(10) Patent No.: US 11,889,171 B2
(45) Date of Patent: Jan. 30, 2024

(54) VEHICULAR CAMERA WITH LENS/COVER CLEANING FEATURE

(71) Applicant: Magna Mirrors of America, Inc., Holland, MI (US)

(72) Inventor: Timothy W. Condron, Canton, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 17/650,908

(22) Filed: Feb. 14, 2022

(65) Prior Publication Data

US 2022/0263990 A1    Aug. 18, 2022

Related U.S. Application Data

(60) Provisional application No. 63/200,110, filed on Feb. 15, 2021.

(51) Int. Cl.
| | |
|---|---|
| H04N 23/52 | (2023.01) |
| G02B 27/00 | (2006.01) |
| B60S 1/12 | (2006.01) |
| F15B 15/20 | (2006.01) |
| H04N 23/51 | (2023.01) |
| H04N 23/54 | (2023.01) |

(52) U.S. Cl.
CPC ............ *H04N 23/52* (2023.01); *B60S 1/12* (2013.01); *F15B 15/20* (2013.01); *G02B 27/0006* (2013.01); *H04N 23/51* (2023.01); *H04N 23/54* (2023.01)

(58) Field of Classification Search
CPC ........ H04N 23/52; H04N 23/51; H04N 23/54; B60S 1/12; F15B 15/20; G02B 27/0006
USPC ........................................................ 348/148
See application file for complete search history.

(56) References Cited

U.S. PATENT DOCUMENTS

| | | | | |
|---|---|---|---|---|
| 3,842,460 | A | * | 10/1974 | Wulf ................... B60S 1/18 15/250.3 |
| 4,157,161 | A | | 6/1979 | Bauer |
| 4,967,437 | A | | 11/1990 | Morse |
| 5,550,677 | A | | 8/1996 | Schofield et al. |
| 5,670,935 | A | | 9/1997 | Schofield et al. |

(Continued)

FOREIGN PATENT DOCUMENTS

| | | |
|---|---|---|
| EP | 2949521 A1 | 12/2015 |
| JP | 06178175 | 6/1994 |
| JP | 2007053448 A | 3/2007 |

*Primary Examiner* — Matthew David Kim
(74) *Attorney, Agent, or Firm* — HONIGMAN LLP

(57) ABSTRACT

A vehicular camera module includes a housing, a camera disposed in the housing, and a transparent cover mounted at the housing. The camera views through the transparent cover. A wiper element is movable relative to the transparent cover to clean the transparent cover. The wiper element is moved via operation of a hydraulic actuator. With the vehicular camera module mounted at an exterior portion of a vehicle, the camera views through the transparent cover in order to capture image data of a scene exterior of the vehicle. With the vehicular camera module mounted at the exterior portion of the vehicle, the hydraulic actuator operates via pressurized fluid supplied to hydraulic actuator to move the wiper element back and forth across the transparent cover to clean the transparent cover of the vehicular camera module.

19 Claims, 6 Drawing Sheets

(56) References Cited

U.S. PATENT DOCUMENTS

| | | | |
|---|---|---|---|
| 5,886,738 A | 3/1999 | Hollenbeck | |
| 5,949,331 A | 9/1999 | Schofield et al. | |
| 6,259,475 B1* | 7/2001 | Ramachandran | H04N 7/18 |
| | | | 348/148 |
| 6,554,210 B2 | 4/2003 | Holt et al. | |
| 6,719,215 B2 | 4/2004 | Drouillard | |
| 6,944,908 B2 | 9/2005 | Hoetzer et al. | |
| 7,014,131 B2 | 3/2006 | Berning et al. | |
| 7,038,577 B2 | 5/2006 | Pawlicki et al. | |
| 7,267,290 B2 | 9/2007 | Gopalan et al. | |
| 7,480,149 B2 | 1/2009 | DeWard et al. | |
| 7,532,233 B2 | 5/2009 | Chu | |
| 7,627,235 B2 | 12/2009 | McCutchen et al. | |
| 7,720,580 B2 | 5/2010 | Higgins-Luthman | |
| 7,855,755 B2 | 12/2010 | Weller et al. | |
| 7,965,336 B2 | 6/2011 | Bingle et al. | |
| 8,542,451 B2 | 9/2013 | Lu et al. | |
| 8,567,963 B1 | 10/2013 | Criscuolo et al. | |
| 8,671,504 B2 | 3/2014 | Ono et al. | |
| 9,319,637 B2 | 4/2016 | Lu et al. | |
| 9,327,689 B2 | 5/2016 | Kikuta et al. | |
| 9,561,595 B1* | 2/2017 | Dellon | F16H 25/186 |
| 9,604,601 B2 | 3/2017 | Hsiao et al. | |
| 9,645,392 B2 | 5/2017 | Yoshimura | |
| 9,707,896 B2 | 7/2017 | Boegel et al. | |
| 10,399,509 B2 | 9/2019 | Byrne et al. | |
| 10,589,726 B1 | 3/2020 | Ingram | |
| 11,140,301 B2 | 10/2021 | Condron et al. | |
| 2003/0090569 A1 | 5/2003 | Poechmueller | |
| 2004/0189831 A1 | 9/2004 | Shibatani et al. | |
| 2005/0166348 A1* | 8/2005 | Wagner | B60S 1/342 |
| | | | 15/250.3 |
| 2007/0132610 A1 | 6/2007 | Guernalec | |
| 2007/0273971 A1 | 11/2007 | Waldmann et al. | |
| 2008/0179482 A1 | 7/2008 | van Amelsfoort | |
| 2009/0244361 A1 | 10/2009 | Gebauer et al. | |
| 2009/0250533 A1 | 10/2009 | Akiyama et al. | |
| 2009/0289126 A1* | 11/2009 | Claas | B05B 3/14 |
| | | | 239/589 |
| 2011/0073142 A1 | 3/2011 | Hattori et al. | |
| 2011/0181725 A1 | 7/2011 | Matsuura | |
| 2011/0225724 A1* | 9/2011 | Bronstein | F03B 13/00 |
| | | | 4/614 |
| 2011/0266375 A1 | 11/2011 | Ono et al. | |
| 2011/0292212 A1 | 12/2011 | Tanabe et al. | |
| 2012/0117745 A1 | 5/2012 | Hattori et al. | |
| 2012/0243093 A1 | 9/2012 | Tonar et al. | |
| 2013/0092758 A1 | 4/2013 | Tanaka et al. | |
| 2013/0094086 A1 | 4/2013 | Bochenek | |
| 2013/0146577 A1 | 6/2013 | Haig et al. | |
| 2013/0209079 A1 | 8/2013 | Alexander et al. | |
| 2013/0255023 A1 | 10/2013 | Kikuta et al. | |
| 2013/0300869 A1 | 11/2013 | Lu et al. | |
| 2013/0319486 A1 | 12/2013 | Kikuta et al. | |
| 2014/0060582 A1 | 3/2014 | Hartranft et al. | |
| 2014/0104426 A1 | 4/2014 | Boegel et al. | |
| 2014/0232869 A1 | 8/2014 | May et al. | |
| 2015/0059106 A1* | 3/2015 | Rief | E04H 4/1654 |
| | | | 180/429 |
| 2015/0138357 A1 | 5/2015 | Romack et al. | |
| 2015/0151721 A1* | 6/2015 | Wadzinski | B60S 1/524 |
| | | | 15/250.04 |
| 2015/0183404 A1 | 7/2015 | Romack et al. | |
| 2015/0277111 A1 | 10/2015 | Bell et al. | |
| 2015/0321621 A1 | 11/2015 | Van Dan Elzen et al. | |
| 2015/0327398 A1 | 11/2015 | Achenbach et al. | |
| 2015/0344001 A1 | 12/2015 | Lopez Galera et al. | |
| 2015/0353024 A1 | 12/2015 | Cooper | |
| 2016/0103316 A1 | 4/2016 | Rousseau | |
| 2016/0264064 A1 | 9/2016 | Byrne et al. | |
| 2016/0272163 A1 | 9/2016 | Dreiocker et al. | |
| 2017/0002803 A1* | 1/2017 | Van de Ven | F04B 39/0011 |
| 2017/0036647 A1 | 2/2017 | Zhao et al. | |
| 2017/0144174 A1* | 5/2017 | Fritze | B05B 3/16 |
| 2017/0210351 A1* | 7/2017 | Ghannam | B60S 1/50 |
| 2017/0349147 A1 | 12/2017 | Blank | |
| 2018/0207691 A1 | 7/2018 | Byrne et al. | |
| 2018/0272958 A1* | 9/2018 | Brouwer | G02B 27/0006 |
| 2019/0024682 A1* | 1/2019 | Walton | F04B 53/144 |
| 2019/0041234 A1 | 2/2019 | Ghannam | |
| 2019/0299938 A1 | 10/2019 | Deegan | |
| 2020/0114877 A1 | 4/2020 | Hu | |
| 2020/0254979 A1 | 8/2020 | Bretagnol | |
| 2021/0094474 A1* | 4/2021 | Vetter | B60S 1/528 |

\* cited by examiner

U.S. 11,889,171 B2

VEHICULAR CAMERA WITH LENS/COVER CLEANING FEATURE

CROSS REFERENCE TO RELATED APPLICATION

The present application claims the filing benefits of U.S. provisional application Ser. No. 63/200,110, filed Feb. 15, 2021, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. It is known to provide a cleaning system that cleans debris from the lens or cover of the camera, such as described in U.S. Publication No. US-2016-0272163 and/or U.S. Pat. Nos. 10,399,509 and 9,707,896, which are hereby incorporated herein by reference in their entireties.

SUMMARY OF THE INVENTION

A driver assistance system or vision system or imaging system for a vehicle that utilizes one or more cameras (preferably one or more CMOS cameras) to capture image data representative of images exterior of the vehicle, and provides a lens/cover cleaner that includes a wiper element that pivots or moves to wipe across the lens or cover of the camera. The wiper element is pivoted or moved responsive to fluid flow through a fluid turbine or hydraulic piston actuating mechanism. The fluid that is used to operate the turbine or move the piston may also be used to spray onto the lens or cover of the camera to assist in cleaning the lens or cover. Optionally, the transparent cover may rotate or spin at high RPMs (such as greater than 1,000 revolutions per minute) to remove water and debris from the cover so that the camera (disposed behind and viewing through the cover) has a clear field of view through the cover and exterior of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Figure 1:
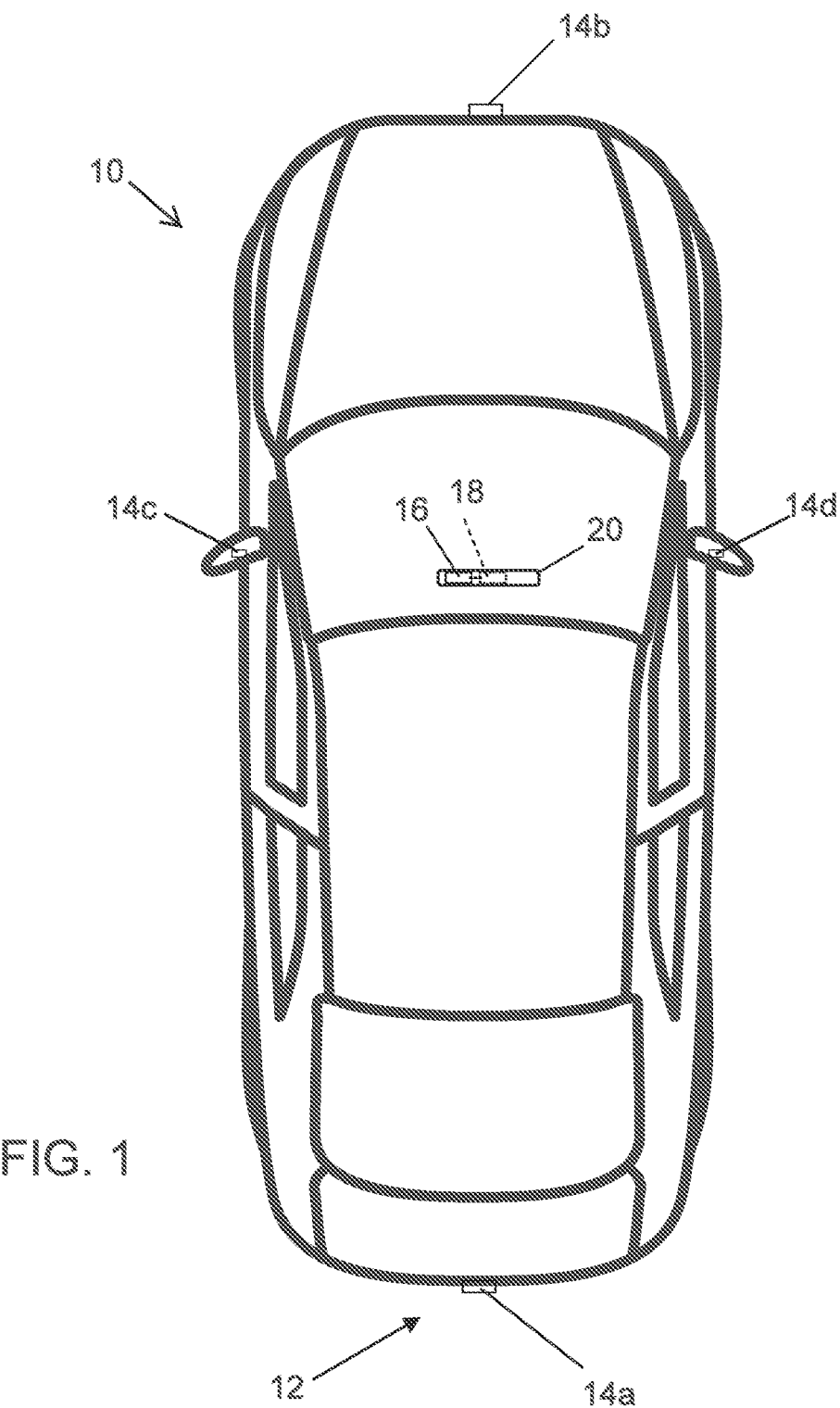
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a. The system 12 may optionally include multiple exterior facing imaging sensors or cameras, such as a forward facing camera 14b at the front (or at the windshield) of the vehicle 10, and a sideward/rearward facing camera 14c, 14d at respective sides of the vehicle. The camera 14a captures images exterior of the vehicle, with the camera 14a having a lens for focusing images at or onto an imaging array or imaging plane or imager of the camera (FIG. 1). Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry that includes an image processor that is operable to process image data captured by the camera or cameras. The ECU 18, via processing at the image processor of captured image data, may detect objects or the like and/or may provide displayed images at a display device 16 for viewing by the driver of the vehicle 10. Although shown in FIG. 1 as being part of or incorporated in or at an interior rearview mirror assembly 20 of the vehicle 10, the ECU 18 and/or the display device may be disposed elsewhere at or in the vehicle 10. The data transfer or signal communication from the camera 14a to the ECU 18 may comprise any suitable data or communication link, such as a vehicle network bus or the like of the equipped vehicle 10.

Figure 2:
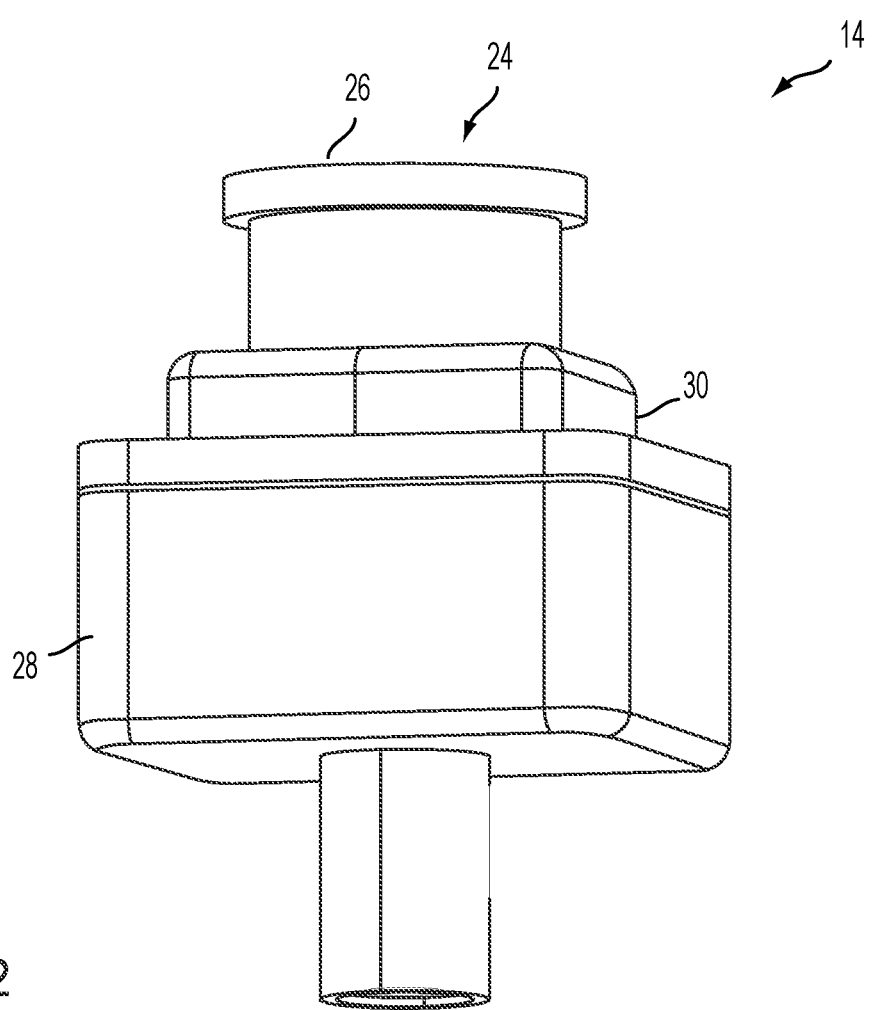
FIG. 2 is a perspective view of a camera module having a lens and/or transparent cover.

As shown in FIG. 2, an exterior camera module 14 is configured to be fixedly mounted at an exterior portion of the vehicle 10 so as to have an exterior field of view. The module 14 includes a lens assembly 24 having an outer clear lens or cover 26 (such as a transparent glass disk) that is disposed in front of the lens of the camera 14. The module 14 includes a rear housing portion 28 and a front or outer housing portion 30 that combine or cooperate to house the camera circuit boards and circuitry (including imager) in a housing cavity. The camera and motor and lens/cover cleaning system may utilize aspects of the cameras and systems described in U.S. Pat. No. 11,140,301, which is hereby incorporated herein by reference in its entirety. For example, a motor and gear assembly may be disposed at and in the housing, whereby operation of the motor rotatably drives an output gear, which in turn rotatably drives a bearing gear to rotate the cover at a bearing at the outer housing portion.

To enhance cleaning of the lens or cover 26, the vision system or camera system utilizes a wiping element that is movable to wipe the outermost lens or cover element to remove debris or water from the lens or cover element. The system drives the wiper across the surface of a camera lens or lens cover by using pressure from washer fluid (such as pressurized fluid supplied via a fluid pump and fluid reservoir). For example, the washer fluid or pressurized fluid or water may be used to drive a turbine or a hydraulic piston to impart movement of the wiper at the lens or cover of the camera.

Figure 3:
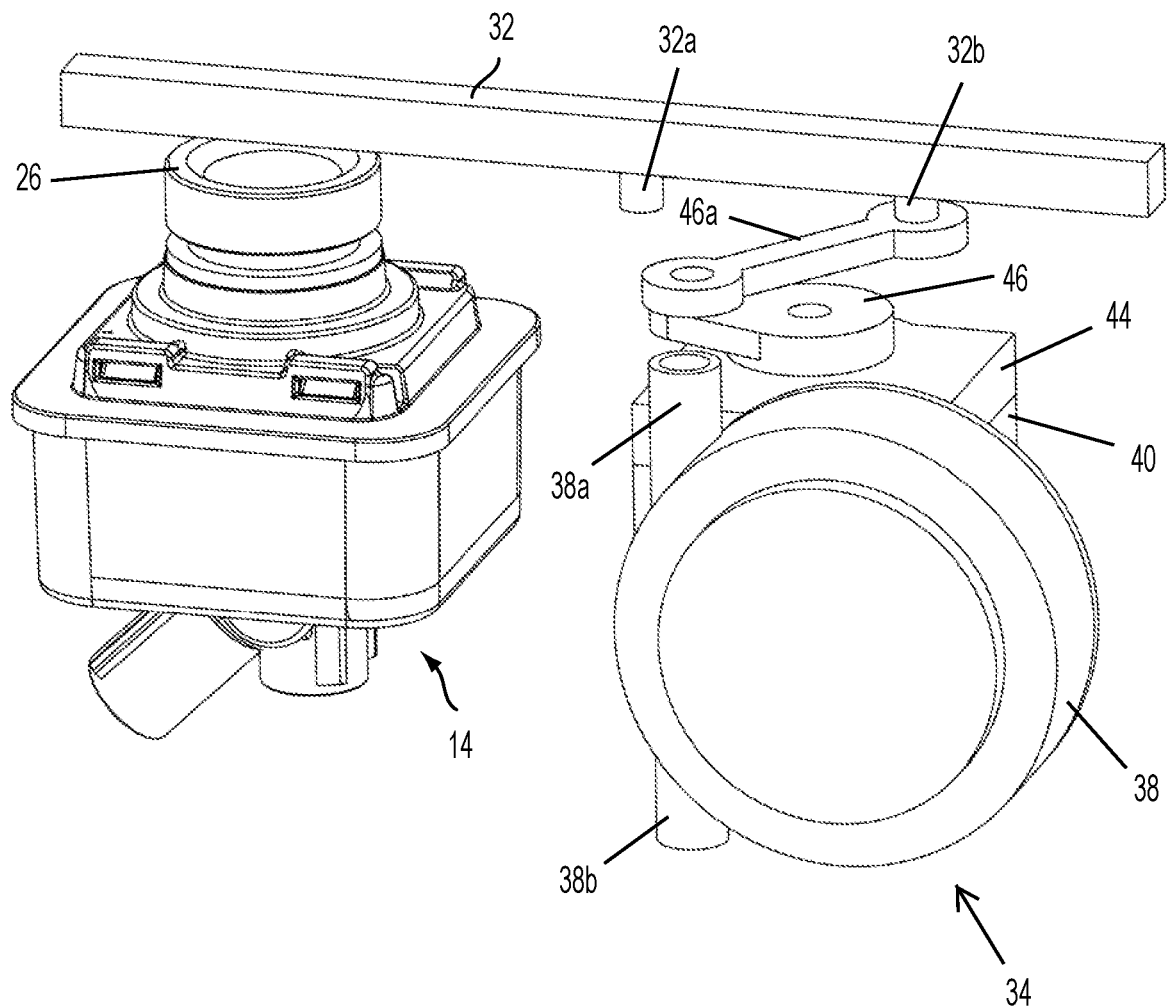
FIG. 3 is a perspective view of the camera module, with a lens wiping mechanism disposed thereat and operable to move a wiping element across the lens or cover via fluid flow through a fluid turbine actuator.
Figure 4:
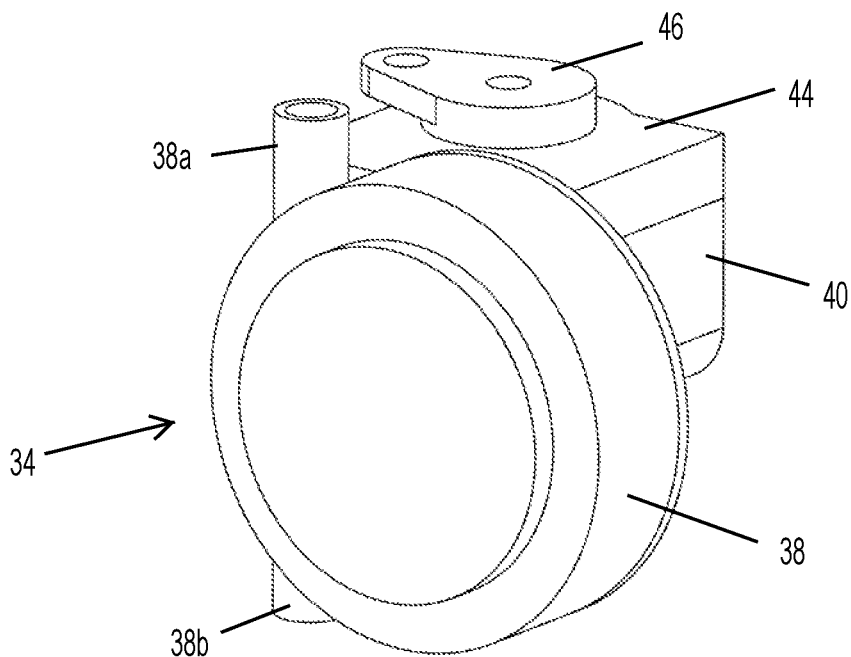
FIG. 4 is a perspective view of the fluid turbine actuator.
Figure 5:
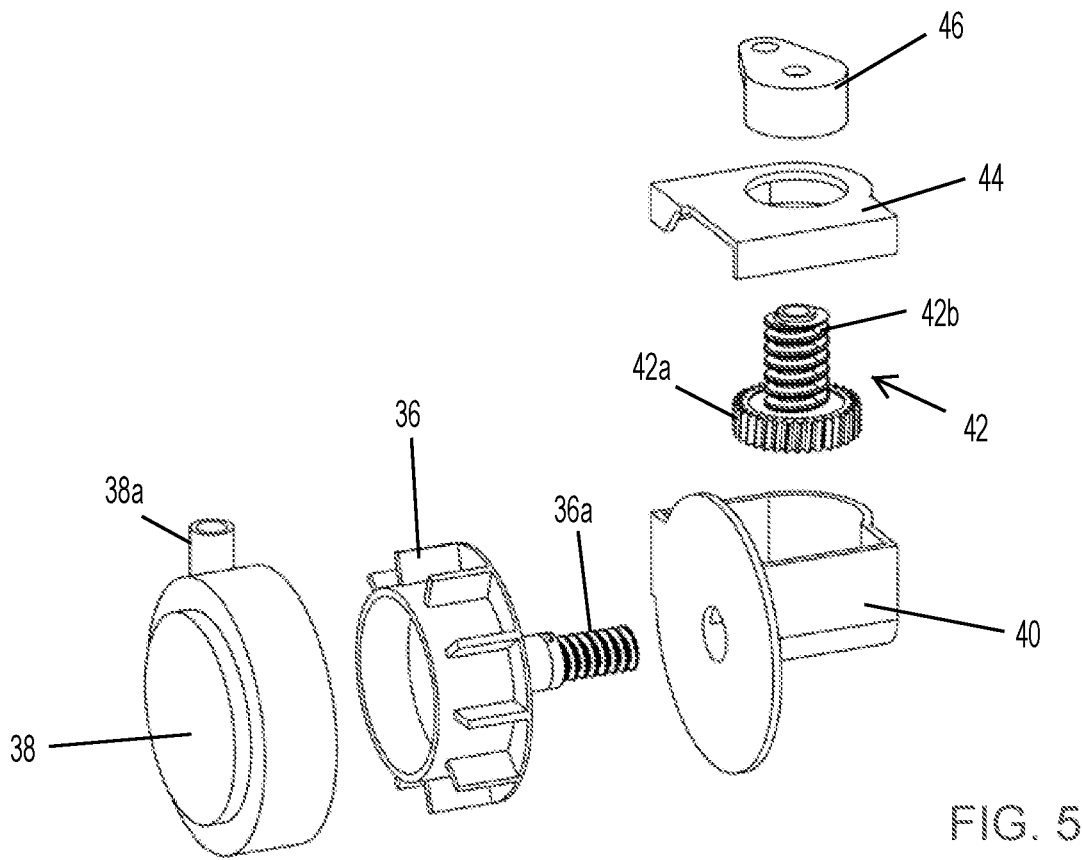
FIG. 5 is an exploded perspective view of the fluid turbine actuator.

As shown in FIGS. 3-5, the camera module 14 may be cleaned via a wiper element 32 that is pivoted or moved via a turbine mechanism 34. The turbine mechanism 34 makes use of the washer fluid pressure to drive a turbine 36, and then may use mechanical reduction to achieve a desired torque or speed at the output crank. The washer fluid may be sprayed onto the lens 26 after driving the turbine 36, or the washer fluid may be discarded after driving the turbine 36, or the washer fluid may be cycled back to the fluid reservoir in a closed loop fluid system. When the washer fluid is cycled back via the closed loop system, a pump draws the fluid from a reservoir, provides it to the turbine 36 and then the fluid is returned to the reservoir. Optionally, some of the fluid used to drive the turbine 36 may be sprayed onto the lens 26 and the rest may be cycled back to the fluid reservoir.

The turbine mechanism 34 comprises the turbine 36 (having a worm gear 36a attached at one side of the turbine 36), which is disposed at or in a side housing 38 that is attached at a lower housing 40 of the turbine mechanism 34. The side housing 38 has inlet and exit ports 38a, 38b through which the fluid flows when the washer device or pump is actuated to rotate the turbine 36 within the side housing 38. The worm gear 36a of the turbine 36 is disposed within the lower housing 40 and rotates with the turbine 36 to rotatably drive a main gear 42 disposed in the lower housing 40. The main gear 42 includes a gear element 42a that engages the worm gear 36a. The main gear 42 also includes a worm gear 42b that rotates with the gear element 42a when the turbine 36 is rotated. The worm gear 42b extends through an upper housing portion or cover 44 and connects to or joins with a crank 46, which is rotated via operation of the turbine 36.

The crank 46 may rotate or move to drive the wiper element 32 (as shown in FIGS. 3-5), and/or the turbine mechanism 34 may operate to rotatably drive a transparent cover at the camera 14 (such as by utilizing aspects of the devices described in U.S. Pat. No. 11,140,301, which is hereby incorporated herein by reference in its entirety), which may be in contact with a fixed or non-moving wiper element 32. The device or system 12 may also include a heater at the lens or cover 26 or at the turbine mechanism 34 to prevent freezing of the fluid. If mechanical reduction is used, the housing may be sealed from the washer fluid, or the washer fluid may be allowed into the housing to provide lubrication for the components.

As can be seen with reference to FIG. 3, the wiper element 32 may be pivotally mounted relative to the camera module 14 with a portion of the wiper element 32 contacting the lens or cover 26 as the wiper element 32 is moved across the lens or cover 32. The wiper element 32 may be pivotally mounted via a pivot pin or axle 32a, with a second pivot pin or axle 32b pivotally connecting to a pivot link 46a attached at the crank 46 of the turbine mechanism 34. Thus, when fluid flows through the side housing of the turbine mechanism, the crank 46 rotates and causes movement of the pivot link 46a and the wiper element 32, which causes back and forth pivotal movement of the wiper element 32 about the pivot pin 32a to move the wiper element 32 back and forth across the lens or cover 26 to wipe the lens or cover 26 and remove dirt or debris or water or the like from the lens or cover 26.

Figure 6:
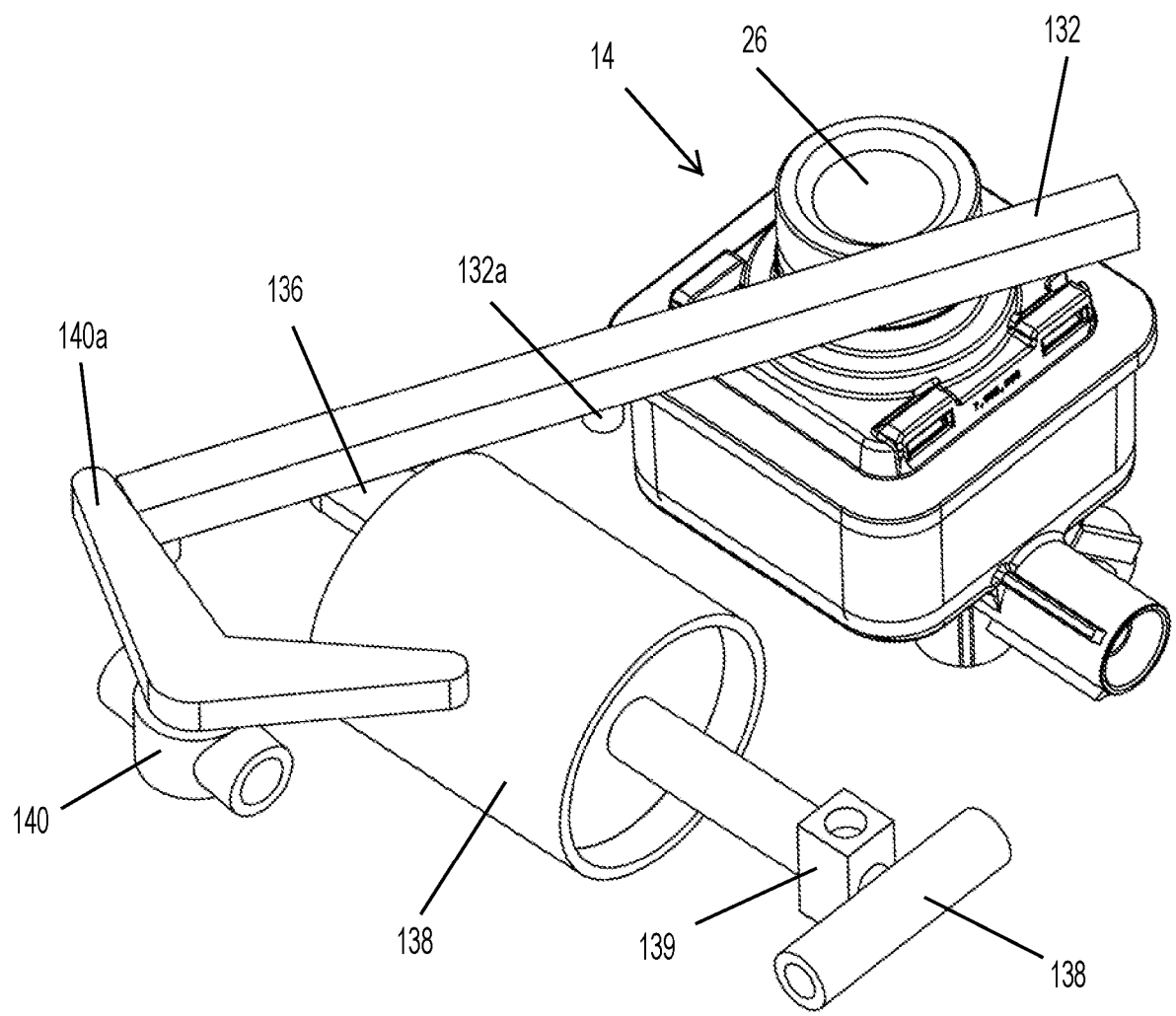
FIG. 6 is a perspective view of the camera module, with another lens wiping mechanism disposed thereat and operable to move a wiping element across the lens or cover via fluid actuated piston mechanism.

Optionally, the fluid actuation of the wiper element may be achieved via a piston mechanism. For example, and with reference to FIG. 6, a fluid actuated piston mechanism 134 includes a reciprocating hydraulic piston 136 to move the wiper element 132 and clean the camera lens or cover 26. The piston 136 moves within a cylinder 138 in response to fluid flow at a fluid port 139 and pivotally attaches at the wiper element 132. The wiper element 132 is pivotally mounted at or near the camera module 14 via a pivot pin or axle 132a (spaced from where the piston 136 attaches at the wiper element 132). Thus, reciprocating movement of the piston 136 causes back and forth pivoting of the wiper element 132 to move the wiper element 132 back and forth across the lens or cover 26 to wipe the lens or cover 26 and remove dirt or debris or water or the like from the lens or cover 26.

The piston 136 may comprise a single-acting piston (only driven by fluid in one direction) with a spring providing the return to the piston's 136 original position. Optionally, the piston mechanism may include a venturi pump 138 to assist the spring with returning the piston 136 to its original position. The washer fluid, after driving the piston 136, may be sprayed onto the lens 26, or it may be discarded or recycled. Optionally, the piston 136 may be double-acting (driven by fluid in both directions). In any of the optional cases, control over the cylinder may be provided with a valve 140 that is actuated directly or indirectly by the movement of the piston 136 or wiper element 132, such as via pivoting of a lever arm 140a attached at the valve 140 to open and close the valve 140 during operation of the lens wiping mechanism.

Figure 7:
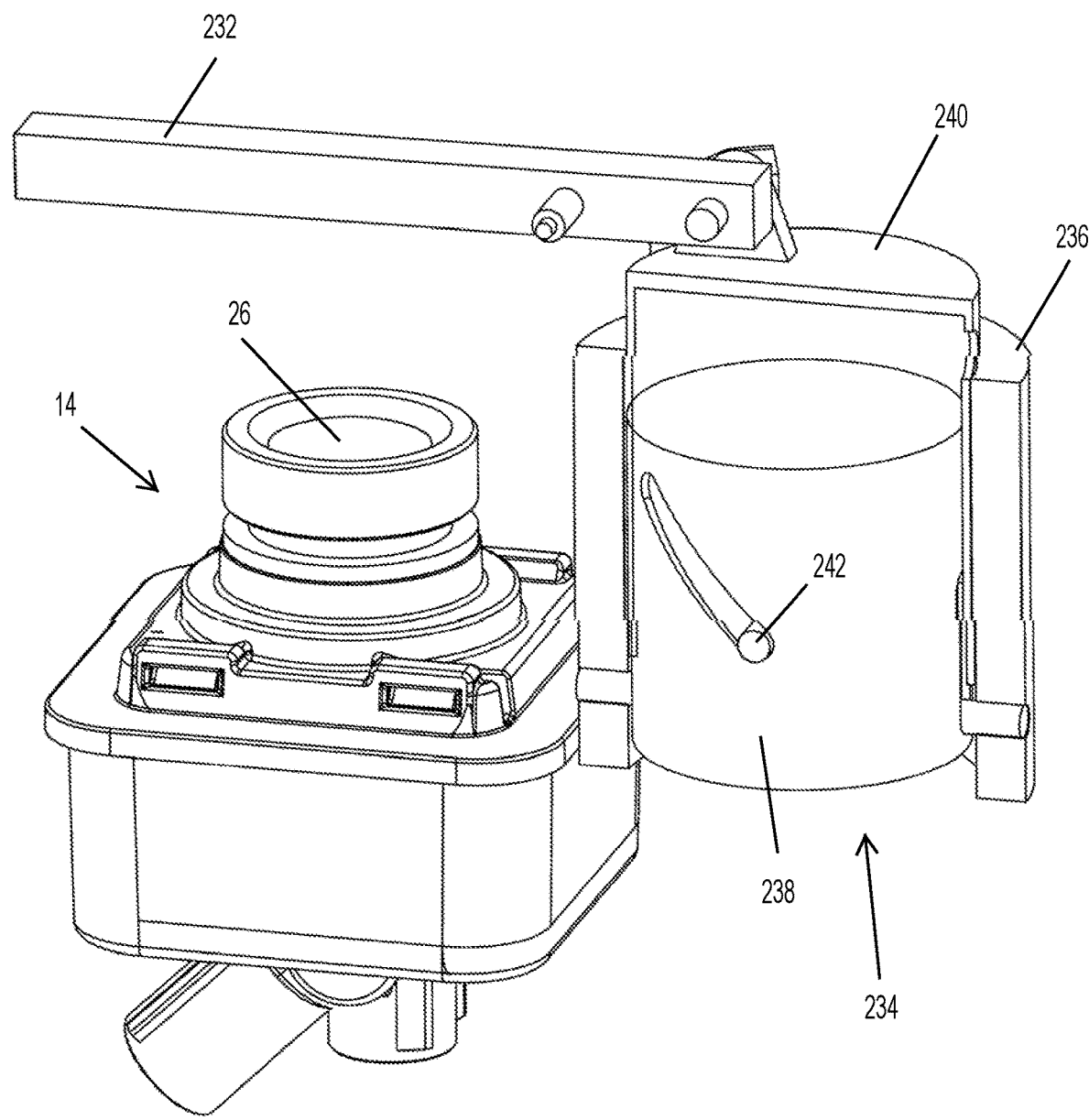
FIG. 7 is a perspective view of the camera module, with another lens wiping mechanism disposed thereat and operable to move a wiping element across the lens or cover via fluid actuated cam piston mechanism.

Optionally, a fluid-actuated piston may rotate the wiper through use of a cam. For example, and such as shown in FIG. 7, a fluid actuated piston mechanism 234 includes a cylinder or outer housing 236 that houses an inner piston 238 and an outer piston 240. The inner piston 238 moves linearly within the outer housing 236 (without rotating), while a cam 242 interfaces with a slot in the outer piston 240 to cause the outer piston to rotate (without linear movement) when the inner piston 238 moves linearly. The outer housing 236 prevents the outer piston 240 from moving linearly while it rotates. The wiper element 232 is attached at an outer end of the outer piston 240 so as to move or pivot with the outer piston 240. Thus, when fluid is provided at the mechanism 234, the reciprocal linear movement of the inner piston 238 causes back and forth pivoting of the outer piston 240, which moves the wiper element 232 back and forth across the lens or cover 26 to wipe the lens or cover 26 and remove dirt or debris or water or the like from the lens or cover 26. Although shown as being spaced from the lens or cover in FIG. 7, the wiper element 232 is configured to engage the lens or cover 26 during operation of the piston mechanism.

Thus, the camera module may include a wiping element that may wipe a portion of the cover to assist in clearing water and debris from the cover. Optionally, a spraying device or forced fluid jet device may be provided that sprays washing fluid onto the cover and/or blows air across the cover to assist in clearing water and debris from the cover. The spraying device may utilize the same fluid that powers the wiper element or may utilize other fluid. Optionally, a heating element may be provided at the cover (such as an electrically conductive trace or coating at the glass cover that heats when an electrical current is applied or such as any other suitable heating means) to heat the cover to assist in melting snow or ice that may be present at the cover. The heating element may be automatically actuated responsive to a temperature sensor sensing an ambient temperature at the vehicle that is below a threshold temperature.

The pressurized fluid may be provided via actuation of a pump, which may be actuated responsive to a user input or when rain or snow or precipitation is sensed (such as by a rain sensor of the vehicle) or responsive to image processing of image data captured by the camera (when such image processing determines contaminants present in front of and in the field of view of the camera). Optionally, for a rearward viewing backup assist camera or rear backup camera, the motor may be actuated to rotate or spin the cover element responsive to the vehicle being shifted into a reverse gear so that the cover element is cleaned each time the backup camera is operated.

The camera and cover element and wiper device may be part of a camera module that includes a housing or bracket that is mounted at an exterior portion of the vehicle so that the camera is fixed relative to the vehicle and views through an aperture of the exterior portion of the vehicle.

The system may utilize various combinations of cleaning concepts for different driving scenarios. For example, if driving in the rain, the cleared outside camera and/or an air knife may be used to keep the water droplets from sitting on the lens or cover glass. This could be activated responsive to activation of the windshield wiper system of the vehicle or responsive to detection of rain by a rain sensor of the vehicle or responsive to dirty-lens-detection algorithms built into the camera or vision system of the vehicle. Upon start-up from a parked or storage situation, the vehicle may automatically activate a cleaning cycle or may activate the cleaning cycle responsive to detection of a dirty or obstructed lens. This may comprise a combination of water spray and air knife or water spray and moving the wiper element for a shorter period of time. By combining various cleaning concepts, the lifetime of the moving parts can be extended as they would not necessarily have to be running all of the time. Additionally, the air knife (such as forced or compressed air blown across the lens as a curtain of forced air) not only is used to clear the lens of particulates, but it also can be used to shield the lens from particulates, so that the particulates do not reach or attach to the lens. In other words, compressed air blowing across the lens effectively establishes a barrier that deflects particulates across the lens and away from the lens before the particulates reach the lens.

Optionally, the camera module may include a rotatable camera lens or cover that is rotated at high RPMs via fluid flow through a turbine mechanism. The rotationally cleared outside camera spins the glass disk to keep camera lens clear. Debris which is farther out will experience more acceleration while closer in will experience significantly less. The camera may be positioned off-center relative to the cover so that the camera views through a region of the cover that will experience the greater acceleration. However, by mounting the camera close to the lens and on the axis of lens rotation, any obstructions remaining on the center of the disk may not be visible to the camera.

To prevent icing, an electrical heater may be included to heat the lens or cover. A washer fluid jet may be added to the system to help remove any dried on debris. To help prevent internal fog, the spinning disk may incorporate fins similar to a centrifugal fan to generate airflow over the inner side of the lens. The module may be sealed to prevent water ingress, and possibly filled with an inert gas to reduce or prevent fogging. A hydrophobic material or coating may be utilized to decrease the rotation rate required to remove water. Use of obstruction detection may allow the system to only run when the camera view is obstructed.

The wiping element may be responsive to detection of dirt or debris or the like at the cover element. For example, responsive to detection (such as via processing of image data captured by the camera) that presence of dirt or ice or debris at the cover element exceeds a threshold amount, a controller may automatically control the fluid supply and cause the wiping element to move into engagement or contact with the cover element. After a period of time operating the wiping element or responsive to determination that the dirt or ice or debris has been sufficiently removed, the controller may control the wiping element to move the wiping element from engagement with the cover element.

Optionally, the fluid spray device may utilize an ultrasonic/Piezoelectric transducer to create cavitation in the liquid to help in clearing the surface of the cover. Optionally, structural waves may be used to cause shear stress between a material layer and an ice layer and thus may be used to enhance water or ice removal.

Optionally, the washer fluid flow may be used to operate the varied cleaning methods. For example, the pressure of the washer fluid may be used to drive a small hydraulic motor or turbine that rotates the lens or transparent cover or that moves the wiper element (with the same fluid driving the turbine of the wiper element, and optionally using different geared turbines to provide high RPM output for rotating the lens or transparent cover and lower RPM output for reciprocating movement of the wiper element). After the fluid flows through the hydraulic motor(s) to drive the motor and/or rotate the transparent cover or move the wiper element, the washer fluid may be sprayed onto the camera lens or transparent cover or may be recycled back to the fluid reservoir. A similar setup could be used for compressed air applications.

Optionally, the camera system may include additional means for cleaning the clear lens, such as a water or liquid or air or gas spraying device that is operable to spray a portion of the clear lens to enhance cleaning or clearing of dirt or contaminants at the clear lens. The lens cleaning system may utilize aspects of the systems described in U.S. Pat. Nos. 9,707,896; 9,319,637 and/or 7,965,336, and/or U.S. Publication Nos. US-2016-0272163; US-2016-0264064; US-2014-0232869 and/or US-2014-0104426, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/ or 5,786,772, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera module comprising:
a camera disposed in a housing;
a transparent cover at the housing, the camera viewing through the transparent cover;
a fluid spraying device that, with the vehicular camera module mounted at an exterior portion of a vehicle, outputs fluid onto the transparent cover;
a wiper element that movably engages the transparent cover to clean the transparent cover;
wherein the wiper element is moved relative to the transparent cover via operation of a hydraulic actuator, and wherein the wiper element pivots back and forth about a pivot axis;
wherein, with the vehicular camera module mounted at the exterior portion of the vehicle, the camera views through the transparent cover and captures image data of a scene exterior of the vehicle;
wherein, with the vehicular camera module mounted at the exterior portion of the vehicle, pressurized fluid supplied to the hydraulic actuator imparts movement of a drive element of the hydraulic actuator to move the wiper element at the transparent cover to clean the transparent cover of the vehicular camera module; and
wherein, as the pressurized fluid is supplied to the hydraulic actuator and as the drive element of the hydraulic actuator moves to pivot the wiper element back and forth about the pivot axis, the fluid spraying device outputs at least a portion of the pressurized fluid supplied to the hydraulic actuator onto the transparent cover.

2. The vehicular camera module of claim 1, wherein the drive element of the hydraulic actuator comprises a turbine that rotates when the pressurized fluid is supplied, and wherein the wiper element is pivotally mounted at a crank mechanism rotatably driven by rotation of the turbine.

3. The vehicular camera module of claim 2, wherein the crank mechanism transforms rotational motion of an output shaft of the turbine into pivotal motion of the wiper element.

4. The vehicular camera module of claim 1, wherein the drive element of the hydraulic actuator comprises a piston disposed in a cylinder, and wherein the piston linearly moves when the pressurized fluid is supplied to the cylinder, and wherein the wiper element is pivotally mounted at the piston and pivots back and forth about the pivot axis via reciprocating linear movement of the piston.

5. The vehicular camera module of claim 1, wherein the drive element of the hydraulic actuator comprises an outer piston that rotatably moves when the pressurized fluid is supplied to a cylinder, and wherein the outer piston is rotatably moved via linear movement of an inner piston responsive to the pressurized fluid supplied at an outer cylinder that partially houses the outer piston and the inner piston.

6. The vehicular camera module of claim 1, wherein the pressurized fluid supplied to the hydraulic actuator and the pressurized fluid provided to the fluid spraying device are from the same pressurized fluid source.

7. The vehicular camera module of claim 1, wherein a portion of the pressurized fluid supplied to the hydraulic actuator is recycled back to a fluid reservoir for further use in powering the hydraulic actuator.

8. The vehicular camera module of claim 1, wherein, with the vehicular camera module mounted at the exterior portion of the vehicle, the pressurized fluid supplied to the hydraulic actuator moves the wiper element back and forth across the transparent cover to clean the transparent cover of the vehicular camera module.

9. The vehicular camera module of claim 1, wherein, with the vehicular camera module mounted at the exterior portion of the vehicle, the pressurized fluid supplied to the hydraulic actuator pivotally moves the wiper element so that the wiper element pivots back and forth across the transparent cover to clean the transparent cover of the vehicular camera module.

10. A vehicular camera module comprising:
a camera disposed in a housing;

a transparent cover at the housing, the camera viewing through the transparent cover;

a fluid spraying device that, with the vehicular camera module mounted at an exterior portion of a vehicle, outputs fluid onto the transparent cover;

a wiper element that movably engages the transparent cover to clean the transparent cover;

wherein the wiper element is moved relative to the transparent cover via operation of a hydraulic actuator, and wherein the wiper element pivots back and forth about a pivot axis;

wherein a drive element of the hydraulic actuator comprises a turbine that rotates when pressurized fluid is supplied to the hydraulic actuator, and wherein the wiper element is pivotally mounted at a crank mechanism rotatably driven by rotation of the turbine;

wherein, with the vehicular camera module mounted at the exterior portion of the vehicle, the camera views through the transparent cover and captures image data of a scene exterior of the vehicle;

wherein, with the vehicular camera module mounted at the exterior portion of the vehicle, the pressurized fluid supplied to the hydraulic actuator imparts movement of the drive element to pivot the wiper element so as to move the wiper element back and forth across the transparent cover to clean the transparent cover of the vehicular camera module; and wherein, as the pressurized fluid is supplied to the hydraulic actuator and as the drive element of the hydraulic actuator moves to pivot the wiper element back and forth about the pivot axis, the fluid spraying device outputs at least a portion of the pressurized fluid supplied to the hydraulic actuator onto the transparent cover.

11. The vehicular camera module of claim 10, wherein the crank mechanism transforms rotational motion of an output shaft of the turbine into pivotal motion of the wiper element.

12. The vehicular camera module of claim 10, wherein the pressurized fluid supplied to the hydraulic actuator and the pressurized fluid provided to the fluid spraying device are from the same pressurized fluid source.

13. The vehicular camera module of claim 10, wherein the pressurized fluid supplied to the hydraulic actuator is recycled back to a fluid reservoir for further use in powering the hydraulic actuator.

14. A vehicular camera module comprising:

a camera disposed in a housing;

a transparent cover at the housing, the camera viewing through the transparent cover;

a wiper element that movably engages the transparent cover to clean the transparent cover;

wherein the wiper element is moved relative to the transparent cover via operation of a hydraulic actuator, and wherein the wiper element pivots back and forth about a pivot axis;

wherein, with the vehicular camera module mounted at an exterior portion of a vehicle, the camera views through the transparent cover and captures image data of a scene exterior of the vehicle;

wherein, with the vehicular camera module mounted at the exterior portion of the vehicle, pressurized fluid supplied to the hydraulic actuator imparts movement of a drive element of the hydraulic actuator to move the wiper element at the transparent cover to clean the transparent cover of the vehicular camera module;

a fluid spraying device that, with the vehicular camera module mounted at the exterior portion of the vehicle, outputs fluid onto the transparent cover;

wherein, as the pressurized fluid is supplied to the hydraulic actuator and as the drive element of the hydraulic actuator moves to pivot the wiper element back and forth about the pivot axis, the fluid spraying device outputs at least a portion of the pressurized fluid supplied to the hydraulic actuator onto the transparent cover;

wherein the pressurized fluid supplied to the hydraulic actuator and the pressurized fluid provided to the fluid spraying device are from the same pressurized fluid source; and wherein a portion of the pressurized fluid supplied to the hydraulic actuator is recycled back to a fluid reservoir for further use in powering the hydraulic actuator or use by the fluid spraying device.

15. The vehicular camera module of claim 14, wherein the drive element of the hydraulic actuator comprises a turbine that rotates when the pressurized fluid is supplied, and wherein the wiper element is pivotally mounted at a crank mechanism rotatably driven by rotation of the turbine, and wherein the crank mechanism transforms rotational motion of an output shaft of the turbine into pivotal motion of the wiper element.

16. The vehicular camera module of claim 14, wherein the drive element of the hydraulic actuator comprises a piston disposed in a cylinder, and wherein the piston linearly moves when the pressurized fluid is supplied to the cylinder, and wherein the wiper element is pivotally mounted at the piston and pivots back and forth about the pivot axis via reciprocating linear movement of the piston.

17. The vehicular camera module of claim 14, wherein the drive element of the hydraulic actuator comprises an outer piston that rotatably moves when the pressurized fluid is supplied to a cylinder, and wherein the outer piston is rotatably moved via linear movement of an inner piston responsive to the pressurized fluid supplied at an outer cylinder that partially houses the outer piston and the inner piston.

18. The vehicular camera module of claim 14, wherein, with the vehicular camera module mounted at the exterior portion of the vehicle, the pressurized fluid supplied to the hydraulic actuator moves the wiper element back and forth across the transparent cover to clean the transparent cover of the vehicular camera module.

19. The vehicular camera module of claim 14, wherein, with the vehicular camera module mounted at the exterior portion of the vehicle, the pressurized fluid supplied to the hydraulic actuator pivotally moves the wiper element so that the wiper element pivots back and forth across the transparent cover to clean the transparent cover of the vehicular camera module.

* * * * *